US007877024B2

(12) United States Patent
Chiba et al.

(10) Patent No.: US 7,877,024 B2
(45) Date of Patent: Jan. 25, 2011

(54) INFRARED SIGNAL DECODE CIRCUIT AND INFRARED SIGNAL DECODE METHOD

(75) Inventors: Norikatsu Chiba, Kanagawa (JP); Toshifumi Yamamoto, Tokyo (JP); Shigeyasu Iwata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/621,086

(22) Filed: Nov. 18, 2009

(65) Prior Publication Data

US 2010/0266075 A1 Oct. 21, 2010

(30) Foreign Application Priority Data

Apr. 16, 2009 (JP) ............................ 2009-100250

(51) Int. Cl.
*H04N 5/00* (2006.01)
*H04Q 9/00* (2006.01)

(52) U.S. Cl. ........................ 398/202; 398/104; 398/203

(58) Field of Classification Search .......... 398/202–214
See application file for complete search history.

(56) References Cited

U.S. PATENT DOCUMENTS

| | | | | |
|---|---|---|---|---|
| 4,011,438 | A * | 3/1977 | Aufderheide et al. | 708/314 |
| 4,989,169 | A * | 1/1991 | McCaslin et al. | 708/312 |
| 5,023,646 | A * | 6/1991 | Ishida et al. | 396/95 |
| 5,483,549 | A * | 1/1996 | Weinberg et al. | 375/151 |
| 5,917,634 | A * | 6/1999 | Otobe | 398/201 |
| 6,160,838 | A * | 12/2000 | Shinohara et al. | 375/130 |
| 2003/0137454 | A1* | 7/2003 | Alexander, Jr. | 342/442 |
| 2004/0039761 | A1* | 2/2004 | Wechel et al. | 708/160 |
| 2006/0067435 | A1* | 3/2006 | Ogawa et al. | 375/340 |
| 2006/0140291 | A1* | 6/2006 | Thomas, Jr. | 375/260 |
| 2006/0256844 | A1* | 11/2006 | Shimizu et al. | 375/152 |
| 2007/0060079 | A1* | 3/2007 | Nakagawa et al. | 455/131 |
| 2007/0121762 | A1* | 5/2007 | Mizukami | 375/329 |
| 2007/0177694 | A1* | 8/2007 | Okunev et al. | 375/333 |
| 2008/0063102 | A1* | 3/2008 | Okunev | 375/261 |
| 2008/0088507 | A1* | 4/2008 | Smith et al. | 342/386 |
| 2008/0266059 | A1 | 10/2008 | Murofushi et al. | |
| 2009/0306487 | A1* | 12/2009 | Crowe et al. | 600/322 |

FOREIGN PATENT DOCUMENTS

| | | |
|---|---|---|
| JP | 63-176084 | 7/1988 |

(Continued)

*Primary Examiner*—Ken N Vanderpuye
*Assistant Examiner*—Tanya Ngo
(74) *Attorney, Agent, or Firm*—Patterson & Sheridan, LLP

(57) ABSTRACT

According to one embodiment, an infrared signal decode circuit includes: a comparator; a correlation signal generator generating a sum of a first detection signal and a second detection signal as a correlation signal, the first detection signal being obtained by performing an absolute value calculation on a first correlation signal, the second detection signal being obtained by performing an absolute value calculation on a second correlation signal, the first correlation signal corresponding to a correlation between a binary signal and a first reference signal with a frequency substantially identical to a base frequency of a subcarrier of an infrared signal, the second correlation signal corresponding to a correlation between the binary signal and a second reference signal with a phase that differ from a phase of the first reference signal by 90 degrees; and a decoder binarizing the correlation signal generated by the correlation signal generator.

5 Claims, 5 Drawing Sheets

FOREIGN PATENT DOCUMENTS

| | | | |
|---|---|---|---|
| JP | 7-297873 | A | 11/1995 |
| JP | 07-322367 | | 12/1995 |
| JP | 08-018472 | | 1/1996 |
| JP | 2005-347858 | A | 12/2005 |
| JP | 2006-174228 | A | 6/2006 |
| JP | 2007-174620 | A | 7/2007 |
| JP | 2007-228397 | A | 9/2007 |
| JP | 2008-028476 | | 2/2008 |
| WO | WO-2006/033151 | A1 | 3/2006 |

* cited by examiner

INFRARED SIGNAL DECODE CIRCUIT AND INFRARED SIGNAL DECODE METHOD

CROSS-REFERENCE TO RELATED APPLICATIONS

This application is based upon and claims the benefit of priority from Japanese Patent Application No. 2009-100250, filed on Apr. 16, 2009, the entire contents of which are incorporated herein by reference.

BACKGROUND

1. Field

One embodiment of the invention relates to an infrared signal decode circuit and an infrared signal decode method.

2. Description of the Related Art

Normally, a remote controller (hereinafter, also referred to as a remote) is used to operate an electronic device such as a television (TV) receiver or the like. In general, the remote includes a communication module that employs infrared light.

Such remote is configured by an infrared light transmitter and an infrared light reception module. The infrared light transmitter is widely referred as a "remote," and is built inside a portable housing. The infrared light transmitter modulates an electric signal associated with the operation through the operation button or the like with low frequency of 30 KHz to 60 KHz, and drives an infrared light emitting diode with the modulated signal. The infrared light transmitter is operated by a battery. The infrared light reception module is built inside an electronic device such as a TV receiver or the like.

The infrared light receiver amplifies, when necessary, an infrared light received by a photo-detector including a photodiode, and demodulates the amplified infrared light to obtain an operation signal. With the operation signal, a remotely controlled device, i.e., an electronic device that is controlled through the remote controller, is controlled to be turned on/off. In general, the infrared light receiver includes a band-pass filter (BPF) provided for processing a signal that is to be input to the detection circuit. The BPF only passes a particular frequency band to reduce influence of the external noise (for example, see Japanese Patent Application Publication (KOKAI) No. 2005-347858).

However, the circuit size and current consumption of the infrared light receiver becomes large due to the inclusion of the BPF. Further, when an analog BPF is used in the infrared light receiver, the BPF properties during the manufacture of the BPF or while it is in use are required to be adjusted, which increases the cost.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
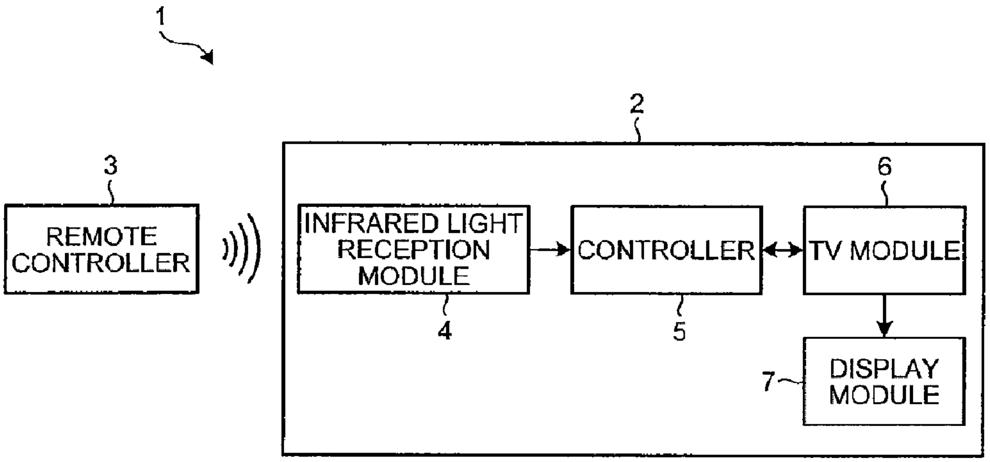
FIG. 1 is an exemplary block diagram of a communication system according to an embodiment of the invention.

Various embodiments according to an infrared signal decode signal and infrared signal decode method of the invention will be described hereinafter with reference to the accompanying drawings. In general, according to one embodiment of the invention, an infrared signal decode circuit, includes: a comparator configured to convert an electric signal converted from an infrared signal to a binary signal, by comparing the electric signal with a sampling frequency with greater than or equal to double of a subcarrier frequency contained in the infrared signal; a correlation signal generator configured to generate a sum of a first detection signal and a second detection signal as a correlation signal, the first detection signal being obtained by performing an absolute value calculation on a first correlation signal, the second detection signal being obtained by performing an absolute value calculation on a second correlation signal, the first correlation signal being a first correlation value within a sampling interval, the second correlation signal being a second correlation value within a sampling interval, the first correlation value corresponding to a correlation between the binary signal and a first reference signal with a frequency substantially identical to a base frequency of a subcarrier of the infrared signal, the second correlation signal corresponding to a correlation between the binary signal and a second reference signal with a phase that differ from a phase of the first reference signal by 90 degrees; and a decoder configured to binarize the correlation signal generated by the correlation signal generator and output the binarized correlation signal as a decode signal.

According to another embodiment of the invention, an infrared signal decode method, includes: comparing an electric signal converted from an infrared signal with a sampling frequency with greater than or equal to double of a subcarrier frequency contained in the infrared signal so as to convert the electric signal to a binary signal; generating a sum of a first detection signal and a second detection signal as a correlation signal, the first detection signal being obtained by performing an absolute value calculation on a first correlation signal, the second detection signal being obtained by performing an absolute value calculation on a second correlation signal, the first correlation signal being a first correlation value within a sampling interval, the second correlation signal being a second correlation value within a sampling interval, the first correlation value corresponding to a correlation between the binary signal and a first reference signal with a frequency substantially identical to a base frequency of a subcarrier of the infrared signal, the second correlation signal corresponding to a correlation between the binary signal and a second reference signal with a phase that differ from a phase of the first reference signal by 90 degrees; and binarizing the correlation signal generated by the generating and outputting the binarized correlation signal as a decode signal.

FIG. 1 is a block diagram of a communication system 1 according to an embodiment. As illustrated in FIG. 1, the communication system 1 includes a television (TV) receiver 2 and a remote controller 3 that transmits an operation command (remote control signal) to the TV receiver 2 via infrared light.

As illustrated in FIG. 1, the TV receiver 2 includes an infrared light reception module 4, a controller 5, and a TV module 6. The infrared light reception module 4 receives an infrared light (infrared signal) output from the remote controller 3, and outputs the operation command (remote control signal). The controller 5 includes a one-chip central processing unit (CPU), and controls modules provided in the TV receiver 2. The TV module 6 displays a video on a display module 7 by the controlling of the controller 5.

Figure 2:
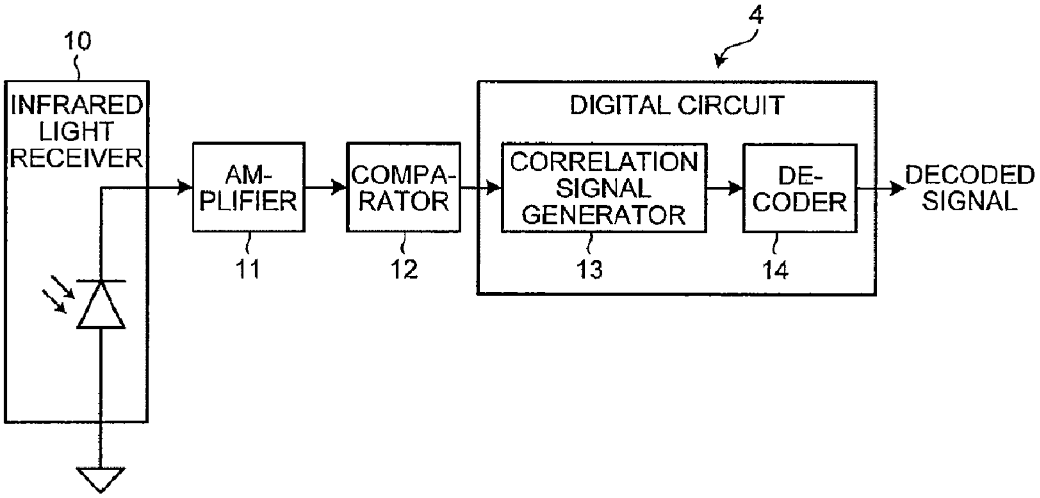
FIG. 2 is an exemplary block diagram of an infrared light reception module in the embodiment.

FIG. 2 is a block diagram of the infrared light reception module 4. As illustrated in FIG. 2, the infrared light reception module 4 includes an infrared light receiver 10, an amplifier 11, a comparator 12, a correlation signal generator 13, and a decoder 14. The amplifier 11 and the comparator 12 are configured by an analog circuit, while the correlation signal generator 13 and the decoder 14 are configured by a digital circuit. As mentioned above, by having the system configuration to be provided with digital circuits for the circuits that process the signal output from the amplifier 11 and the comparator 12, the circuit size of the entire system can be reduced. In addition, the influence due to variations among analog circuits based on miniaturization can be eliminated. Therefore, compared to a system having more analog circuits, variations in manufacture are reduced, the manufacture cost is reduced, and properties are stabilized. In addition, the property adjustment used to be required in the analog BPF is no longer required.

The infrared light receiver 10 receives the infrared light (infrared signal) output from the remote controller 3 by a photo-detector (PD). Further, the infrared light receiver 10 converts the infrared light (infrared signal) received by the photo-detector to a voltage by a current to voltage (IV) conversion amplifier.

The amplifier 11 is a variable gain amplifier that amplifies the voltage obtained by the infrared light receiver 10. The voltage obtained by the infrared light receiver 10 is amplified as mentioned above because the electric signal (voltage) is weak when the remote controller 3 and the infrared light receiver 10 are separated apart. In addition, the amplifier is provided with the variable gain because it is preferable to appropriately adjust the gain of the amplifier 11, since the amplitude of the signal obtained from the infrared light reception module 4 changes largely when the distance between an infrared signal generator (not illustrated) of the remote controller 3 and the infrared light reception module 4 changes largely.

The comparator 12 includes a one-bit comparator or the like, and converts the electric signal (voltage) amplified by the amplifier 11 to a binary digital signal (binary signal). During the conversion into the digital signal, the comparator 12 compares a sampling frequency of greater than or equal to the double of a subcarrier frequency included in the infrared signal with the electric signal converted from the infrared signal. As mentioned above, the one-bit comparator is implemented in the comparator 12 so that the size of the analog circuit and the power consumption required for the comparator 12 is to be reduced.

Figure 3:
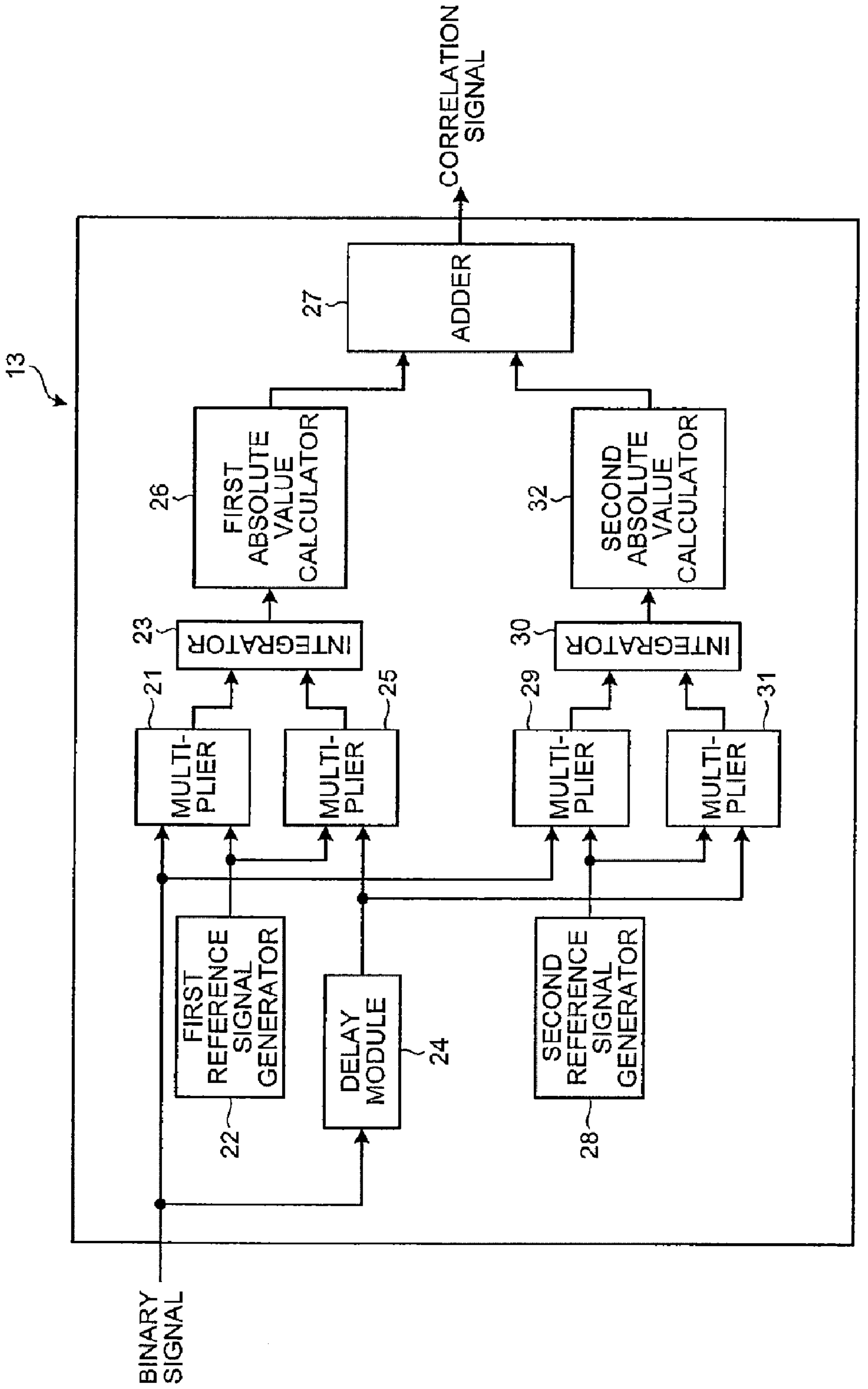
FIG. 3 is an exemplary block diagram of a correlation signal generator in the embodiment.

The correlation signal generator 13 calculates a correlation signal corresponding to a correlation between a subcarrier (for example, a sinusoidal wave with 38 KHz) and the binary signal output from the comparator 12. FIG. 3 is a block diagram of the correlation signal generator 13. As illustrated in FIG. 3, the correlation signal generator 13 includes a multiplier 21, a first reference signal generator 22, an integrator 23, a delay module 24, a multiplier 25, a first absolute value calculator 26, an adder 27, a second reference signal generator 28, a multiplier 29, an integrator 30, a multiplier 31, and a second absolute value calculator 32. The first reference signal generator 22 generates a first reference signal. The delay module 24 is configured by a flip-flop, a memory, and the like, and defines a sampling interval by a delay amount. The second reference signal generator 28 generates a second reference signal.

Figure 4:
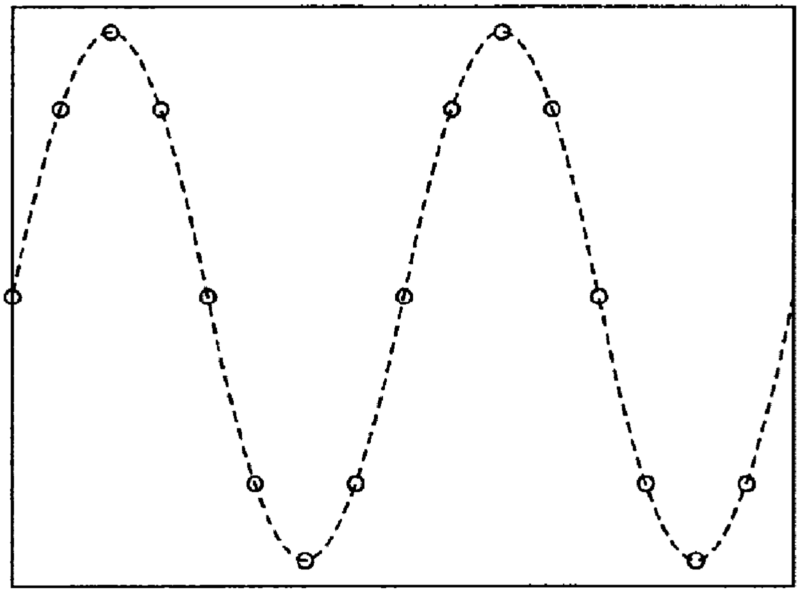
FIG. 4 is an exemplary graph of a reference signal output from a reference signal generator in the embodiment.

The first reference signal generator 22 and the second reference signal generator 28 are explained below. The first reference signal generator 22 repeatedly outputs a reference signal indicated by the symbol "°" in FIG. 4. The dotted line in FIG. 4 represents a sinusoidal wave with a frequency that is the same as abase frequency of the subcarrier of the infrared signal. The symbols "°" in FIG. 4 represent points where the aforementioned sinusoidal wave is sampled with the sampling frequency of eight times the frequency of the sinusoidal wave. The frequency of the subcarrier is, for example, 38 KHz, and the sample points of oversampling of the subcarrier (38 KHz) become the reference signal.

The second reference signal generator 28 outputs a reference signal that differ from the reference signal output from the first reference signal generator 22 by 90 degrees phase. That is to say, the second reference signal generator 28 repeatedly outputs the reference signal that is shifted from the reference signal illustrated in FIG. 4 by two samples.

Figure 5:
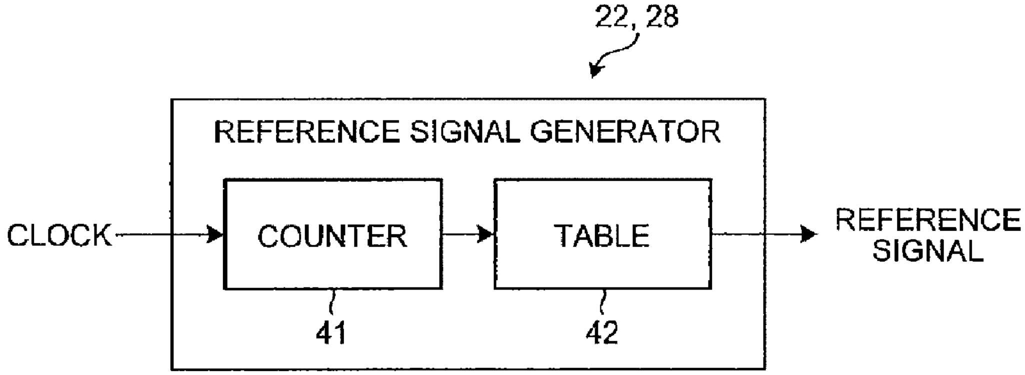
FIG. 5 is an exemplary block diagram of a reference signal generator in the embodiment.

FIG. 5 is a block diagram of the first reference signal generator 22 and the second reference signal generator 28. As illustrated in FIG. 5, the first reference signal generator 22 and the second reference signal generator 28 include a counter 41 and a table 42. When the sample points of the sample frequency of eight times the frequency of the sinusoidal wave is to be output, the counter 41 is implemented so as to repeatedly count from 0 to 7. Then, the table 42 outputs a reference signal in accordance with the value from 0 to 7 outputted. Here, the first reference signal generator 22 and the second reference signal generator 28 may share the common counter 41.

Next, processing of each module in the correlation signal generator 13 is explained with reference to FIG. 3. As illustrated in FIG. 3, the binary signal output from the comparator 12 is input to the multiplier 21. The multiplier 21 multiplies the first reference signal output from the first reference signal generator 22 and the binary signal output from the comparator 12. Further, the binary signal output from the comparator 12 is input to the multiplier 25 via the delay module 24. The multiplier 25 multiplies the first reference signal output from the first reference signal generator 22 and the binary signal input thereto from the comparator 12 via the delay module 24. The multiplication result of the multiplier 21 and the multiplication result of the multiplier 25 are input to the integrator 23. The integrator 23 integrates a difference between the multiplication result of the multiplier 21 and the multiplication result of the multiplier 25. As a result, a correlation value between the input signal and the first reference signal within the sampling interval defined by the delay amount in the delay module 24 is calculated. The correlation signal, which is the output signal from the integrator 23, is input to the first absolute value calculator 26. Then, the first absolute value calculator 26 executes the detection via the calculation of the absolute value, and outputs the detection signal.

On the other hand, the binary signal output from the comparator 12 is input to the multiplier 29. The multiplier 29 multiplies the second reference signal output from the second reference signal generator 28 (the reference signal that differs from the reference signal output from the first reference signal generator 22 by 90 degrees phase) and the binary signal output from the comparator 12. Further, the binary signal output from the comparator 12 and processed by the delay module 24 is input to the multiplier 31. The multiplier 31 multiplies the second reference signal output from the second reference signal generator 28 and the binary signal output from the comparator 12 and processed by the delay module 24. The multiplication result of the multiplier 29 and the multiplication result of the multiplier 31 are input to the integrator 30. The integrator 30 integrates a difference between the multiplication result of the multiplier 29 and the multiplication result of the multiplier 31. As a result, the correlation value between the input signal and the second reference signal are calculated for the sampling interval defined by the delay amount in the delay module 24. The correlation signal, which is the output signal of the integrator 30, is input into the second absolute value calculator 32. Then, the second absolute value calculator 32 executes the detection by calculating the absolute value, and outputs the detection signal.

The adder 27 adds the detection signal output from the first absolute value calculator 26 and the detection signal output from the second absolute value calculator 32. Then, the adder 27 generates the sum of the detection signals as the correlation signal, and outputs it to the decoder 14.

Figure 6:
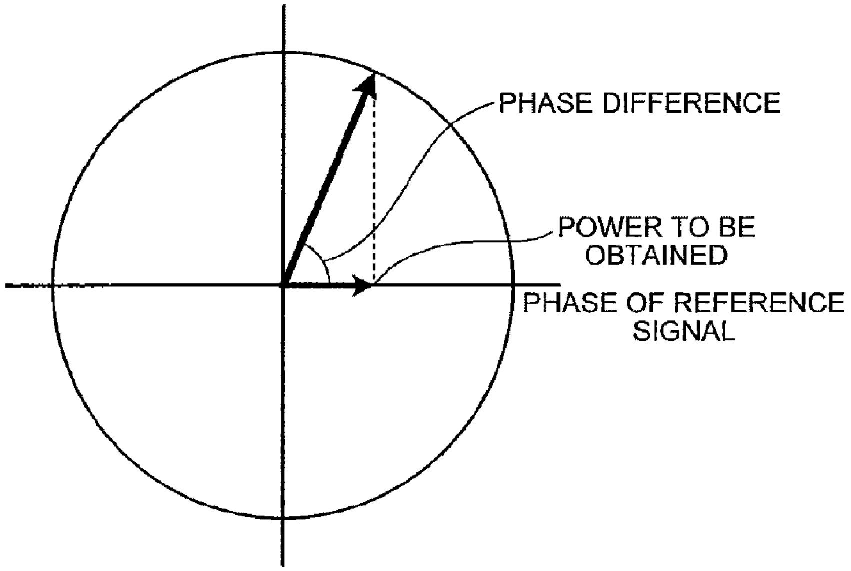
FIG. 6 is an exemplary explanatory diagram illustrating the case where the phase of an input signal and the phase of a reference signal differ from each other in the embodiment.
Figure 7:
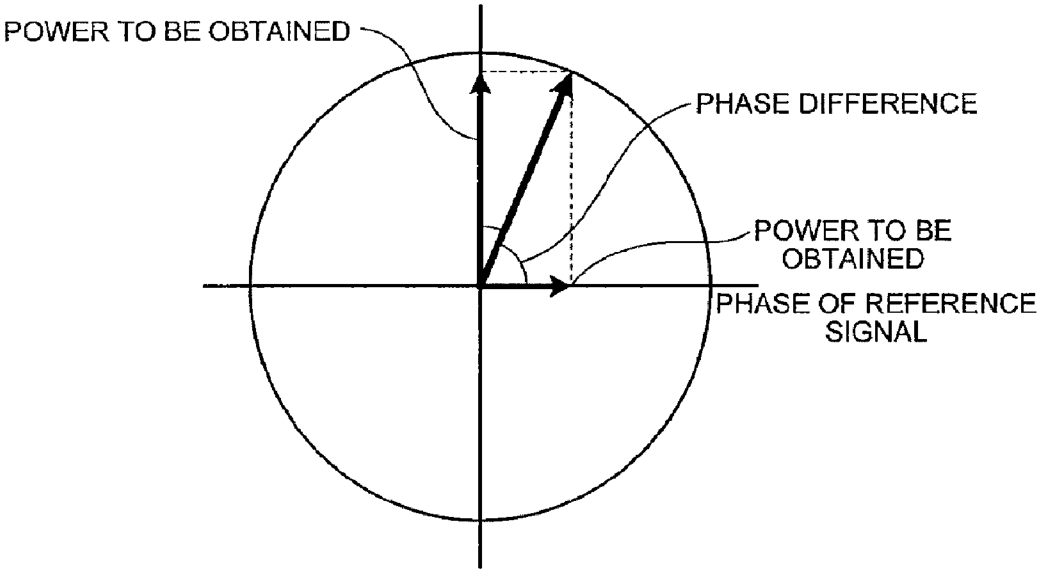
FIG. 7 is an exemplary explanatory diagram illustrating the case where the phase of an input signal and the phase of an reference signal differ from each other in the embodiment.

The reason why the correlation signal generator 13 includes the first reference signal generator 22 and the second reference signal generator 28 is explained. It is hardly the case that the phase of the clock used for the sampling in the comparator 12 coincides with the phase of the clock used for the samplings in the first reference signal generator 22 and the second reference signal generator 28. In other words, the phase of the binary signal, which corresponds to the infrared signal output from the remote controller 3 and binarized by the comparator 12, often differs from the phase of the reference signal in the correlation signal generator 13. When the phase of the binary signal differs from the phase of the reference signal in the correlation signal generator 13, the power of the correlation signal obtained in the correlation signal generator 13 is reduced, as illustrated in FIG. 6. Therefore, in the embodiment, the first reference signal generator 22 and the second reference signal generator 28 are implemented in the correlation signal generator 13 to calculate the correlation values between the binary signal output from the comparator 12 and each of the two reference signals that differ from each other in 90 degrees phase. Then, as illustrated in FIG. 7, the detection signals obtained based on the each correlation value are synthesized so that the correlation signal with the power that is substantially the same as that of the input signal can theoretically be obtained.

Figure 8:
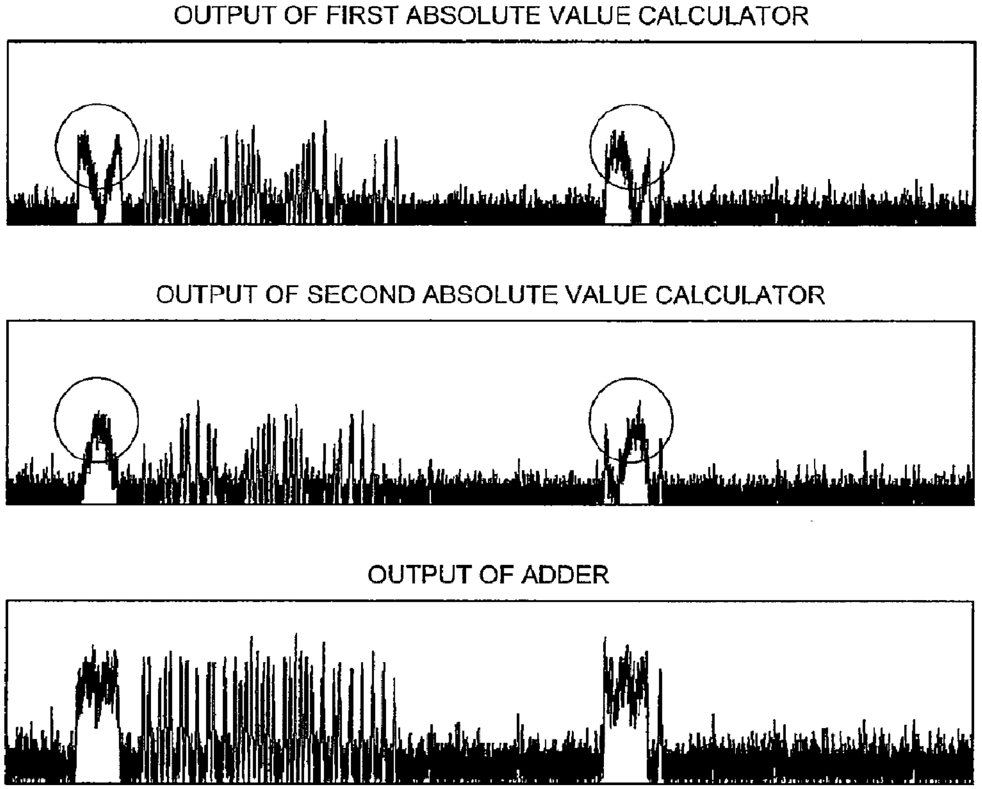
FIG. 8 is an exemplary explanatory diagram illustrating a synthesized correlation signal in the embodiment.

FIG. 8 is an explanatory diagram of the correlation signal synthesis. As illustrated in FIG. 8, the detection signal (correlation signal) output from the first absolute value calculator 26 and the detection signal (correlation signal) output from the second absolute value calculator 32 each have missing portions (the portion within the circle in FIG. 8) due to the phase deviation. However, the adder 27 adds the detection signal (correlation signal) output from the first absolute value calculator 26 and the detection signal (correlation signal) output from the second absolute value calculator 32, and as illustrated in FIG. 8, the correlation signal output from this adder 27 is turned out to have no missing portion within the wave. Hence, the increase in the power of the correlation signal in comparison to that before the summation can be recognized. As mentioned before, the system can deal with the phase deviation by using the two reference signals that differ from each other for 90 degrees phase.

That is to say, in the embodiment, the correlation is performed while having the waveform of 38 KHz component as the reference signal. Accordingly, the bandpass filter that passes only the particular frequency band (38 KHz) is no longer required.

Figure 9:
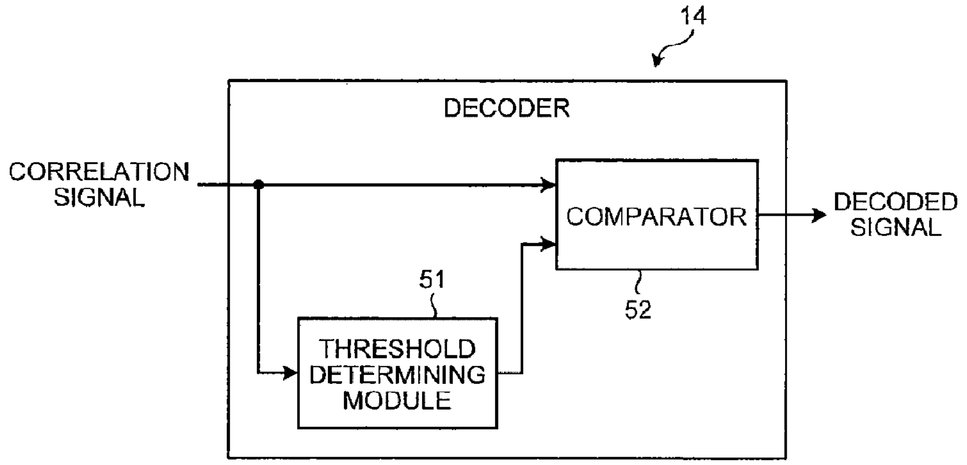
FIG. 9 is an exemplary block diagram of a decoder in the embodiment.

Back to FIG. 3, the correlation signal processed by the adder 27 as mentioned above and output from the correlation signal generator 13 is input into the decoder 14. FIG. 9 is a block diagram of the decoder 14. As illustrated in FIG. 9, the decoder 14 includes a threshold determination module 51 and a comparator 52. The threshold determination module 51 determines a threshold used when the correlation signal output from the correlation signal generator 13 is binarized in the comparator 52. The comparator 52 binarizes the correlation signal output form the correlation signal generator 13 using a threshold signal output from the threshold determination module 51. The binary signal is output form the decoder 14 as the decode signal. The decode signal output from the decoder 14 is input into the controller 5, and used by the controller 5 for the control of the TV module 6.

As mentioned above, according to the embodiment, the infrared signal is converted into the electric signal, and further converted into the binary signal. Then, the absolute value calculation is performed on a first correlation signal that is a correlation value between the binary signal and the first reference signal with the frequency substantially identical to the base frequency of the subcarrier of the infrared signal, within the sampling interval, to generate the first detection signal. Further, the absolute value calculation is performed on a second correlation signal that is the correlation value between the binary signal and the second reference signal with the phase differing from the phase of the first reference signal for 90 degrees, within the sampling interval, to generate the second detection signal. Then, the first detection signal and the second detection signal are added, and the sum that is the correlation signal is binarized and output as the decode signal. Accordingly, the correlation is performed while having the waveform of the base frequency component of the subcarrier of the infrared signal as the reference signal. Therefore, the bandpass filter used to be required in the infrared signal decode circuit is no longer necessary, so that the circuit size can be reduced and the power consumption can be reduced.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An infrared signal decode circuit, comprising:

a comparator configured to compare an electric signal converted from an infrared signal with a sampling frequency greater than or equal to double of a subcarrier frequency contained in the infrared signal to convert the electric signal to a binary signal;

a correlation signal generator configured to generate a sum of a first detection signal and a second detection signal as a correlation signal, the first detection signal being obtained by performing an absolute value calculation on a first correlation signal, the second detection signal being obtained by performing an absolute value calculation on a second correlation signal, the first correlation signal being a first correlation value within a sampling interval, the second correlation signal being a second correlation value within a sampling interval, the first correlation value corresponding to a correlation between the binary signal and a first reference signal with a frequency substantially identical to a base frequency of a subcarrier of the infrared signal, the second correlation signal corresponding to a correlation between the binary signal and a second reference signal with a phase that differ from a phase of the first reference signal by 90 degrees; and a decoder configured to binarize the correlation signal generated by the correlation signal generator and output the binarized correlation signal as a decode signal.

2. The infrared signal decode circuit of claim 1, wherein the correlation signal generator and the decoder are configured by a digital circuit.

3. The infrared signal decode circuit of claim 1, wherein the comparator is configured by a one-bit comparator.

4. The infrared signal decode circuit of claim 1, further comprising an amplifier configured to amplify the electric signal, wherein the amplifier has a variable gain.

5. An infrared signal decode method, comprising:

a comparator comparing an electric signal converted from an infrared signal with a sampling frequency greater than or equal to double of a sub carrier frequency contained in the infrared signal to convert the electric signal to a binary signal;

generating a sum of a first detection signal and a second detection signal as a correlation signal, the first detection signal being obtained by performing an absolute value calculation on a first correlation signal, the second detection signal being obtained by performing an absolute value calculation on a second correlation signal, the first correlation signal being a first correlation value within a sampling interval, the second correlation signal being a second correlation value within a sampling interval, the first correlation value corresponding to a correlation between the binary signal and a first reference signal with a frequency substantially identical to a base frequency of a subcarrier of the infrared signal, the second correlation signal corresponding to a correlation between the binary signal and a second reference signal with a phase that differ from a phase of the first reference signal by 90 degrees; and binarizing the correlation signal generated by the generating and outputting the binarized correlation signal as a decode signal.

* * * * *